INVENTOR.
KEITA YAMAMOTO

BY Bucknam and Archer
HIS ATTORNEYS

INVENTOR.
KEITA YAMAMOTO

BY Buchnam and Archer
HIS ATTORNEYS

INVENTOR
KEITA YAMAMOTO
BY Bucknam and Archer
HIS ATTORNEYS

INVENTOR.
KEITA YAMAMOTO
BY Buchnam and Archer
HIS ATTORNEYS

United States Patent Office 3,451,126
Patented June 24, 1969

3,451,126
METHOD OF MAKING A WOVEN FIBER CIRCUIT ELEMENT

Keita Yamamoto, Tokyo, Japan, assignor to Rikagaku Kenkyusho, Yamato-machi, Kitaadachi-gun, Saitama-ken, Japan, a corporation of Japan
Filed Aug. 4, 1965, Ser. No. 477,279
Claims priority, application Japan, Aug. 8, 1968, 39/45,180
Int. Cl. B01j *17/00;* H01l *7/00*
U.S. Cl. 29—576 3 Claims

ABSTRACT OF THE DISCLOSURE

This invention relates to a circuit element composed of organic or inorganic glass fibers each having a metallic core wherein said fibers having metallic cores and glass layers of the same or different kinds are woven to form junction regions of compounds separated from the glass phase formed by bonding of the glass layers, or thin crystalline layers or thin surface films thereof, an energy barrier against electrons and holes being formed in said junction regions, whereby non-linear voltage-current characteristics can be realized to give the performance characteristics of transistors or diodes of various types.

This invention relates to a fiber circuit element.

In recent years increasing emphasis has been placed on the manufacture of smaller solid electronic circuits and circuit component parts, and it is general tendency to use more and more vapor coated films and formed films as active and passive elements. Using substrates of these films, the elements of metal-insulator-metal junction type and semiconductor-metal-semiconductor junction type have been developed for practical use, in addition to the conventional impurity semiconductors of point-contact type and pn junction type. These elements are available in diversified types, including those having regions which cannot always be called single crystals and those whose non-linear voltage-current characteristics depend on discharges in insulator, unlike pn junctions of semiconductors whose non-linear characteristics are based on the impurity energy level of electrons or holes. At any rate, all the elements thus far made known are those formed of active elements such as diodes and transistors and passive elements such as inductors and capacitors which are formed of thin films with lamination in a plane, in view of the technical conditions in formation of single crystalline thin films or polycrystalline thin films. The same can be said of magnetic thin film elements, and they may be called "plane" elements for this reason.

The present invention is concerned with a "fiber" circuit element which consists of a "fiber" (hereinafter called a fiber or wire) formed of a thin film element and which can be spun into yarn or woven into fabric like natural and synthetic fibers and which, endowed with electric or magnetic characteristics which may be required as the case may be, can be arranged in a desired quantity in a desired place. In the basic conception of assembling as well as of construction of circuit element, the fiber circuit element according to the invention is entirely different from the conventional ones.

The term fiber herein used means particularly the fiber of inorganic glass and in some cases of organic glass (though not confined to glass structure, as described hereunder), but generally speaking, any material which can be spun into yarn or further woven into fabric is useful for the purpose of the invention. Glass structure should be distinguished from two other structures; crystal and amorphous.

Glass structure is unique and not amorphous in the broad sense because, in a short distance, it is nearly crystalline chemical structure, and in a long distance, it is a network structure having many different strains and spatial expanse. The network structure is modified by injection of various metallic ions and non-metallic ions, but, unlike crystal, it has a very flexible capacity and is capable of receiving far more amounts of metallic ions and non-metallic ions than the amounts deduced from an ordinary formula of chemical structure, while still maintaining the glass structure. On account of these properties, thin films of semiconductors and insulating materials such as oxides, sulfides, and arsenites can be formed on part or whole of the surface of glass fiber.

The dimensional relationships between the core and the layer of material to surround and enclose the core can be suitably selected depending on the intended use and the process of manufacture, for example, depending on whether the fiber is knitted or woven as it is, spun into yarn, or spun into yarn and then woven into fabric.

Here, the term "metallic core" includes metallic filament or metallic layer settled in glass fibers.

In the case where importance is attached to the elasticity of end yarn or cloth or knitted or braided article and where the fiber surface should be protected against damage in the course of manufacture, it is advisable to use a core as thin as possible, say from about 2 to 5 microns in diameter and to use a surrounding material having a wall thickness of from 10 to 20 microns. In other words, the ratio of the two components is preferably 1:2 or more.

Conversely where the mechanical elasticity of end product is not a matter of significance but a stress is laid on electric conductivity and other properties in junctions of wefts and warps, the above ratio may be about 1:0.1, that is, the core may be covered only with a thin film of glass. In any case, a major difference lies between conventional coated conductors and the element according to the invention in that the latter has sufficient thinness, spinability, and weaveability for use as a fiber.

The special feature of the invention is illustrated briefly by a single example. A single fiber which consists of a fine metallic wire, not more than 10 microns in diameter, coated with inorganic glass to a wall thickness of about 20 microns, has a remarkable bending strength and a tensile strength substantially as great as ordinary glass fiber. Its flexibility is improved so that it can be spun with twisting. Moreover, non-linear performance characteristics of diodes and triodes made of the single fiber in combination with other single fibers are as satisfactory as those of vacuum tubes and singlecrystal semiconductor devices.

In short, such glass fiber element in which a fine metallic core is enclosed has many advantages and features because, in addition to the excellent electric, mechanical and thermal properties, it ensures homogeneity of junction regions, is insensitive to impurities, easier to manufacture than conventional elements, and involves less manufacturing cost.

Now the invention will be described in more detail, starting with description of the structure of single fiber, with reference to the accompanying drawings, in which.

Figure 1:
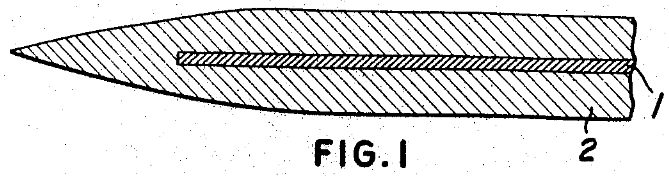
FIG. 1 is a longitudinal sectional view of a typical single fiber as a basic unit of circuit element embodying the invention.
Figure 2:
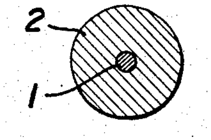
FIG. 2 is a sectional view of the single fiber of FIG. 1, cut off perpendicularly to the axis.

Referring specifically to FIG. 1 which shows a typical single fiber according to the invention, numeral 1 indicates a metallic wire, about 10 microns or less in diameter, and 2 indicates inorganic or organic glass, which forms a fiber having a metallic core inside and an overall diameter of from about 20 to 50 microns. FIG. 2 shows a cross section of the above fiber.

Whereas filass fiber referred to above has good bending strength and tensile strength but is usually not resistant to "crumpling," the fiber according to the invention possesses improved quality of glass fiber and sufficiently withstands spinning and weaving operations.

Figure 3:
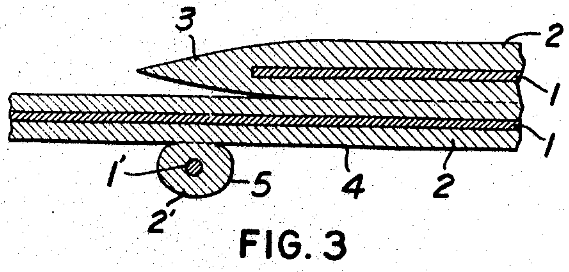
FIG. 3 is a sectional view illustrating an example of junction between single fibers.

In FIG. 3 there is shown a typical non-linear element formed of single fibers jointed together. In the figure, single fibers 3 and 4 are formed of metallic cores 1 and glass layers 2 of the same types, while the fiber 5 is formed of a metallic core 1' which is different from 1 and a glass layer 2' which is different from 2. The fibers 3 and 4, and 4 and 5 are respectively jointed together with glass layers.

Jointing of such single fibers can be accomplished readily by heating them together with application of a suitable pressure, in the same manner as in fusing and bonding together ordinary single fibers of glass which have no metallic cores.

The junction regions may take the form of crystalline laminar structures of such compounds as CuO, ZnO, SiO, GeS, $As_2Se_3$ and the like separated partly by the crystallization, or in some cases wholly from oxides, sulfides, and arsenites, and the like, or in some cases of such single substances as Ge and Si metallized by reduction of compound glasses, such as oxides, sulfides and etc. In some other cases a thin film formed by a chemical reaction such as oxidation on the surface of metal used as the core can form the junction region. Still in other cases, other metallic cores are bonded by spot contact on the surface of thin films thereby to serve as diodes or transistors.

The metallic cores of single fibers described hereinbefore and hereinafter are all adapted for use as terminals for electronic circuit, either directly or, in some cases, with electrodes without energy barrier, or ohmic contact electrodes.

By reference to FIG. 3, the structure of the energy barrier will be described in further detail hereunder.

If the single fibers 4 and 5 have cores of the same metal, e.g. copper, and different glass layers (for example, if the fiber 4 has a glass layer of silicate glass containing Pb and the fiber 5 has vanadium glass containing Te), a diode can be made by jointing them together with heat. At this time, it is presumed that thin crystalline layers of PbO, Te, etc. separated from the vitreous phase are formed between the metallic cores 1 and 1', and that they altogether form an energy barrier against electrons and holes.

Aside from formation of crystalline barriers from more than two types of constituents, it is in some case possible that a film layer of only one type of semi-conductor crystal is formed which, together with one of the metallic cores in point contact therewith, constitutes a diode. It is further possible that an energy barrier is formed by effluence of metallic core, in either of film layers of glass and crystal, and regardless of whether the film layer is semiconductive or insulating.

Figure 4:
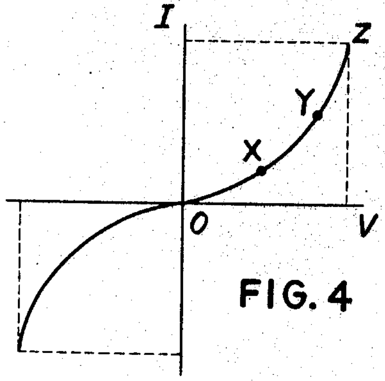
FIGS. 4, 5 and 6 are graphs showing non-linear characteristics between voltage and current specifically obtained upon application of an electrical field to junctions between single fibers.
Figure 5:
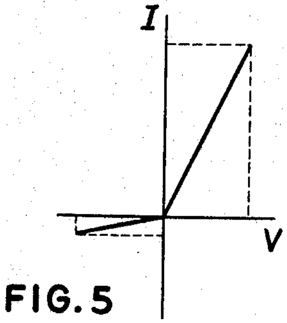

It is for this reason that the non-linear current-voltage characteristics as shown in FIG. 4 or FIG. 5 are obtained. This is demonstrated by the fact that the above non-linear characteristics can be reproduced in electric properties of two types of fibers formed of the same glass and different metallic cores. It is further possible to take advantage of differences in geometrical structure, for example in thickness of fiber, in controlling diode characteristics and discharge characteristics, as explained elsewhere in connection with fabrication of transistor through selective combination of fibers.

Under the invention, an element having a ratio of resistance in the normal direction to that in the reverse direction in the rectifying action as shown in FIG. 5, of about 1:40, can be readily manufactured.

FIG. 4 shows, by way of an example, the non-linear characteristics observed between voltage and current upon application of an electric field with electrodes between single fibers of the same type, as in the junction of single fibers 3 and 4 shown in FIG. 3. In this example, the metal is silver and glass material is lead-borate glass. Such curves of non-linear characteristics take different shapes depending on the type of substances constituting the respective regions, chemical bonds involved, and other factors, but in any case the electrical field strength is from about $10^4$ to $10^6$ volts/cm., or too weak for any dielectric breakdown. In practical experiments a large number of test specimens showed good reproducibility and stability.

In this case, the following fiber materials can be employed:

| Inorganic glass fiber | | | | Organic glass fiber | |
|---|---|---|---|---|---|
| Core | Glass layer composition ratio (mol percent) | | | Core | Glass layer material |
| Fe | $B_2O_3$,20 | PbO,60 | CdO,20 | Ag | Phenol resin. |
| Ni | $Bi_2O_3$,20 | PbO,50 | $B_2O_3$,30 | Ni | Methacrylate resin. |
| Pt | $V_2O_5$,20 | $P_2O_5$,20 | PbO,60 | Zn | Epoxy resin. |

An organic fiber is made by dispersing minute powdery crystals of an organic semiconductor having a relatively low molecular weight, e.g. perylene, anthracene, coronene, or violanthrene, in a plastic material such as acrylonitrile resin or polyethylene which possesses sufficient plasticity and elasticity as fiber and has spinnability and weavability, and spinning the composition into fiber with a core of iron, silver, copper or the like, and then by making junctions with such fiber, whereby special current-voltage non-linear characteristics as shown in FIG. 3 are obtained.

In such organic semiconductor, electric conductivity along the surface of crystal is greater than the conductivity perpendicular thereto, and there is a noticeable difference between the two. In coronene, for example, the surface conductivity is $10^{12}\Omega$ cm., $\Delta\epsilon$ (band gap) 1.65 ev., and perpendicular conductivity is $10^{17}\Omega$ cm., $\Delta\epsilon$ (band gap) 1.70 ev.

By way of an example of the invention, the same amplification and oscillation performances of triode can be obtained as those described before by the use of an active element woven of fibers which consist of a glass layer of acrylonitrile resin wherein fine powder of coronene is dispersed, and a core of Cu. The element can also be used for switching purpose.

In this case, the relation between the dispersed organic semiconductor such as coronene and the high molecular compound as dispersion medium is believed to be equivalent to the relation in inorganic glass as above described, that is, the relation between the organic glass material such as $SiO_2$, $Al_2O_3$, $GeO_2$, $TeO_2$, GeS, $As_2Se_3$, or the like and inorganic ions injected therein.

Electrical and mechanical properties of the active element can also be controlled by other methods, for example by using those fibers as such or by crystallizing part or whole of the glass layer.

FIG. 5 shows non-linear voltage-current characteristics which are obtained upon application of an electric field to junctions of a single fiber 4 and another single fiber 5 of a different type illustrated in FIG. 3.

In this example, the core 1 of single fiber 4 and the core 1' of fiber 5 are both of silver wire. The glass layer 2 of single fiber 4 consists of lead-borate glass vitrified by injection of ions of a metallic element belonging to 3rd, 4th, or 5th Period of Group I, II, or III of the Periodic Table. The glassy component 2' of single fiber 5 is formed of lead-borate glass vitrified by injection of ions of a metallic element belonging to 3rd, 4th, or 5th Period of Group IV, V, or VI, of the Periodic Table. In this example, distinctive current characteristics in normal and reverse directions (diode characteristics) are obtained, and an element having a rectification efficiency of more than 90% can be formed.

In this case, fiber materials for example of the following compositions may be used:

| Core | Glass layer composition ratio (mol. percent) | |
|---|---|---|
| Cu | $B_2O_3$, 20 | CdO, 80. |
| Phosphor bronze | $SiO_2$, 40 | PbO, 60. |

Figure 6:
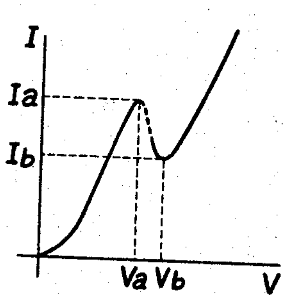

FIG. 6 shows a typical example of negative resistance characteristics obtained experimentarily of a two-terminal circuit element according to the invention. It is obtained by junction of phosphate glass fiber and lead glass fiber, in some case with localized crystallization of minute parts of junction regions. Sometimes it is convenient to inject suitable metallic ions beforehand in the glass of those junction regions. Further, the tunnel diode characteristics as shown in FIG. 6 are obtained by pn junction of germanium metallized from germanium sulfides glass doped to its impurity element through crystallization and reduction thereof.

Figure 7:
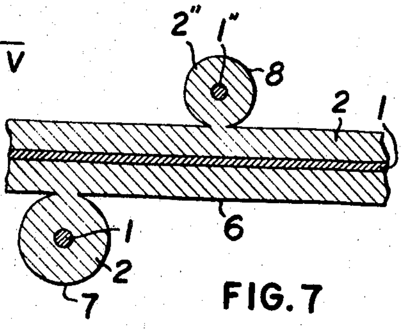
FIG. 7 is a sectional view of a three-terminal circuit element formed by junctions among three different single fibers 6, 7 and 8.

FIG. 7 shows an example of triode formed of single fibers jointed together according to the invention. The single fibers 6, 7, and 8 are formed of different metal cores 1, 1', and 1'', and different glass layers 2, 2', and 2''. The fiber 6 is jointed to the fiber 7, and also to 8, with heat.

Figure 8:
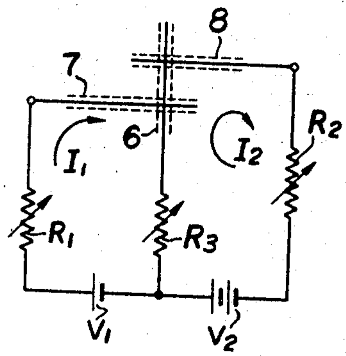
FIG. 8 is a circuit diagram wherein the circuit element shown in FIG. 7 is connected to external bias voltages $V_1$ and $V_2$, and loads $R_1$, $R_2$, and $R_3$.
Figure 9:
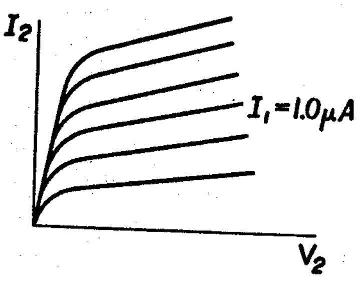
FIG. 9 illustrates the relation between the voltage $V_2$ and current $I_2$ on the circuit shown in FIG. 8, using the current $I_1$ as a parameter.

FIG. 8 shows an embodiment of the invention which consists of a triode illustrated in FIG. 7 connected with external circuit and power source. In the element shown, the respective junctions of pairs of single fibers, i.e. 6 and 7, and 6 and 8 have non-linear voltage-current characteristics, and performance characteristics similar to those of transistor and triode are obtained. FIG. 9 shows a typical example of performance characteristics obtained by adjustments of the bias voltages $V_1$ and $V_2$ and resistances $R_1$, $R_2$, and $R_3$ of FIG. 8, using the current $I_1$ as a parameter.

As an example of transistor embodying the invention, one having a current gain of about 15–50 by the base-input circuit connection can be easily manufactured.

Because the circuit element of the invention is formed of highly flexible elastic fibers, it is possible to arrange a large number of the active elements above described on a narrow plane or in a limited space by braiding or weaving said elastic fibers into any desired shape.

Figure 10:
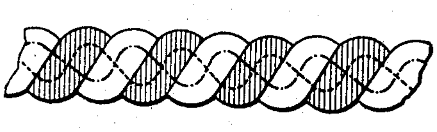
FIG. 10 is an enlarged view showing a typical circuit element consisting of a yarn formed of two single fibers twisted together according to the invention.

Another feature of the invention lies in the fact that the afore-said single fibers can be twisted or spun or further braided or woven into passive elements. By way of an example, as shown in FIG. 10, inductive elements each having self-inductance ranging from about 0.01 to $1\mu$ h. can be made by twisting two or more lengths of lead-borate glass fiber having iron cores into a single element.

When two lengths of vanadate glass fiber having a copper core were jointed crosswise at right angles to each other, the electric capacity of the resulting element was about 5 $\mu\mu f.$, but when one length was wound a single turn around the other and bonded together by fusing, some of the resulting elements had a capacity as high as about 300 $\mu\mu f.$ In this case, electric induction is negligibly small and the products can be used as capacity elements.

The performance characteristics, and intensities or magnitudes of induction and capacity of the active and passive elements described hereinbefore can be varied with the type, thickness, and quality of metallic wire to be used and the type, thickness, chemical structure, and the like of the glass layer, and also with the thickness of junction region between fibers, and further, in some cases, with operating temperature and other factors.

According to an embodiment of the invention, the electric resistance of a circuit element having a glass layer, about 3 microns in thickness in the junction region, is about 100K $\Omega$. With the decrease of glass layer thickness, the electric resistance is decreased generally as an exponential function, and circuit elements having two or more of such junctions can constitute an adequately useful circuit for practical application.

A special advantage of the circuit element of the invention over conventional products is that it is formed of elastic fibers and hence is high flexible. The thinner the single fibers used, the greater the advantage derivable as fiber. Moreover, treatment of the single fibers for crystallization of part or whole of the glass layer at the time of jointing them together can improve the non-linear characteristics of resulting element.

In other words, whether an active or passive element according to the invention should have junction regions of glass structure or crystalline structure is decided upon by taking into account the non-linear performance characteristics and mechanical performance of circuit element required, and is not to be construed to limit in any way the fundamental construction of the fiber circuit element of the invention. The same applies to organic glass fibers having metallic cores which will be described later.

The same can also be said of such other inorganic glass fibers than above referred to, as oxide glass fibers including silicate glass fiber and arsenate glass fiber. Germanate and telluride glass fibers can likewise constitute fiber circuit elements of the invention, by introduction of suitable metallic ions or in some cases suitable semi-metallic ions into the oxides.

In experiments conducted with photosensitive silver halide glass, and also with glass of sulfate such as germanium sulfate, what have been described above hold in many cases.

Further, when semiconductive glass is used as inorganic glass fiber, not only non-linear circuit elements having performance characteristics such as of rectification, amplification, and oscillation, but also passive elements can be formed.

Still more, the same characteristics as above can be realized in organic glass fibers having metallic cores. For example, when silver wire was used as core and polyethylene or phenol resin was used as inorganic glass layer, the resulting fibers provided in experiments active and passive elements capable of rectification, amplification, and oscillation, like the inorganic glass fibers above described.

In the construction of a circuit element according to the invention, for example when an inorganic glass fiber is employed, the energy level in the junction region is differentiated for the electrons or holes corresponding to ordinary impure semiconductors of p-type and n-type or in some cases for both, depending on the type of glass and metallic core. Further, in cases where a point-contact structure is employed, the metallic core of one of the fibers is directly contacted with the semiconductor of the other fiber, or in some cases with the layer structure of insulator, whereby a point-contact type diode or transistor can be assembled in the same manner. As an example, a fiber of silicate glass containing lead (with an iron core) and a cadmium-containing borate glass fiber having a core of copper are jointed together, when the diode direction is from the former to the latter. Similarly, in a diode made of a lead-borate glass fiber having a copper core and a lead-borate glass fiber having a silver core jointed together, it is also possible to control the diode direction so that it runs from the former to the latter.

Thus, by selection of fiber types and by heat treatment, the direction of diode having a rectifier action can be controlled. Therefore, a shown in FIG. 11, the fibers A and B are used as weft and warp, respectively. Fibers of same type A but of different diameters are indicated by symbols $A_1$ and $A_2$. Likewise, fibers of same type B but of different diameters are indicated by $B_1$ and $B_2$.

Next, junction-type transistors will be described specifically with respect to the difference of geometrical construction of junction regions. In distribution circuits of minute active elements formed by fine weaving of $A_1$, $A_2$ and $B_1$, $B_2$ into a cloth-like texture as shown, the performance characteristics of transistors such as ($B_1A_1B_2$) and ($A_1B_1A_2$) are primarily fixed, and the amplification direction of signals is also established. Thus, the present invention provides elements capable of constituting transistors corresponding to either of ordinary transistors of pnp-junction or npn-junction type or of point-contact type formed essentially of germanium or silicon.

The circuit element according to the invention has an additional advantage because it is more water-resistant than conventional circuit elements.

The fiber formed with a metallic core inside in accordance with the invention may not only have a surrounding layer of a single substance but may also be formed of multi-layers of more than two types of substances. In the latter case, the surrounding layers may be formed of inorganic compounds other than metals or of organic compounds or both, as the case may be. It is further possible to form a metallic layer on the outermost layer, or the surrounding layer when the core is enclosed in a monolayer.

In addition, said metallic core is not only intended to use the metal and its alloy, such as Ag, Al, Fe, W or Mo, but to use the metal and its alloy, such as Se, Ge, As or Sb, and Si.

Indeed, such metal can be used as a core in a thin line, besides it can be used as a core by reducing chemically the glass included said metal and metallizing said metal. Furthermore, it may be made into a glass fiber having a metallic core as a shape of concentric circle by vitrifying a part of the metallized metallic layer through an oxidizing reaction.

As will be noted clearly from the foregoing description, the invention provides a circuit element which is entirely different from solid circuit elements of conventional types and which has the following advantageous features:

(1) Capable of being spun into yarn and woven into fabric, with suitable elasticity and plasticity as fiber.

(2) Any desired number of elements having desired properties can be arranged in a very limited space.

(3) Element having glass layer is mechanically stable thanks to the isotropy and homogeneity of the glass structure.

(4) Chemically insensitive to impurities.

(5) Remains practically unaffected by temperature changes.

(6) Adapted for quantity production.

(7) Manufacturable at low cost.

(8) Permits ready modification of input impedance and output impedance of circuit to best meet the intended use of the circuit.

To be definite, the impedances can be varied over a range of from some ohms to some MΩ, by selecting glass layer and metallic core of suitable types and sizes before spinning and weaving the single fibers into element, and also by changing the input end and output end of network woven of active elements.

Next, use of the element according to the invention in an electronic circuit will be described in detail.

It laid a very important foundation for the development of transistors that so-called p-type semiconductor and n-type semiconductor were made first by introducing traces of impurities as donors or acceptors into the base material of single crystal of Ge or Si. As the result, it has become possible to control easily the energy level of holes or electrons in semiconductors. And this possibility has much contributed to subsequent technological progress of wide varieties of diodes and transistors which utilize pn junctions and point-contact structure of semiconductors, as well as to researches on electrons and holes in motion in the Brillouin zone of crystals. Still further technological development in the field or semiconductors has given birth to active elements and other circuit elements in widely diversified varieties in structures and functions. It is nearly impossible herein to cover all such structures and functions. What should be pointed out here in connection with the present invention is that all the circuit elements for use in the field of semiconductor technology including not only such active elements as point-contact diodes and transistors of early types, pn-junction diodes and transistors, multiple-carrier field-effect transistors, four-pole-junction transistors, double-base diodes, thyratron transistors, and surface barrier transistors, but also passive elements such as semiconductive capacitors utilizing germanium can be formed by crystallization of glass structure from the glass fiber thereby to form point contact or pn-junction, in accordance with the invention. In this connection, it must be noted that studies on so-called inorganic glass have made great strides in recent years and that semiconductive glass and other types of glass have been put in use which are made from single substances or compounds having low softening points, e.g. from room temperature at which some types of glass take liquid form to 100°–200° C., and good electron conductivity or hole conductivity. They are essentially different from glass of ordinary types as products of silicate which are insulators having high softening points. Interfacial deposition of metals and semi-metals contained in such low-softening-point glass through crystallization thereof, and structures of point contact and pn junction, are described in the first half of this specification.

From the standpoints of vitrifying conditions and stability in the glass region, compound glass is most common, and fabrication of compound semiconductors of point-contact type and pn-contact type can be said to be technically feasibile with least difficulty. However, semiconductors such as Se and As can be vitrified directly in the form of single substances. Ge is first vitrified in the form of GeSx and from the resultant Ge can be deposited and crystallized.

In addition, the present invention can be embodied in drift transistors and PNIP transistors devised for improvement of frequency characteristics, and also in multi-carrier field-effect-type transistors and M–I–M transistors, by selection of suitable types, thickness, and other dimensions of glass layers and metallic cores for the fibers, with vitrification of metallic interface by heat treatment or with modification of the glass structure by injection of ions.

If crystalline structure is to form the basis of electrical properties of an active element, it is of course necessary to promote crystal deposition during heat treatment of silicic acid, arsenic acid, sulfate, selenate, etc. as essential glass-forming materials as the solvents for constituting the vitreous phase, by increasing the concentration of ions to be injected and by taking advantage of the ranges and limtis for vitrification.

The same applies to the manufacture of PNPN junction-type transistors for switching purpose, and SSS (silicon-symmetrical switching) elements, avalanche transistors, and the like with the elements according to the invention.

The examples cited above are invariably active elements consisting essentially of crystalline semiconductors obtained by separation from inorganic glass phase. More recently, such active elements as semiconductor-metal-semiconductor junction transistors and metal-insulator-metal transistors which are not necessarily restricted to the crystalline structure and charged energy level of conventional semiconductors have been disclosed. Needless to say, the present invention can be incorporated into all such newer types of transistors.

So far description has been made specifically on the use of glass fibers according to the invention to provide transistors having the same functions as ordinary transistors. Hereinafter the special features of the invention in circuit elements having such properties and functions which are never obtained by ordinary active elements will be explained.

The following description relates to examples in case of connection of said fibers materials, that is, inorganic glass fiber and organic fiber.

Figures 11, 12, 13, 14:
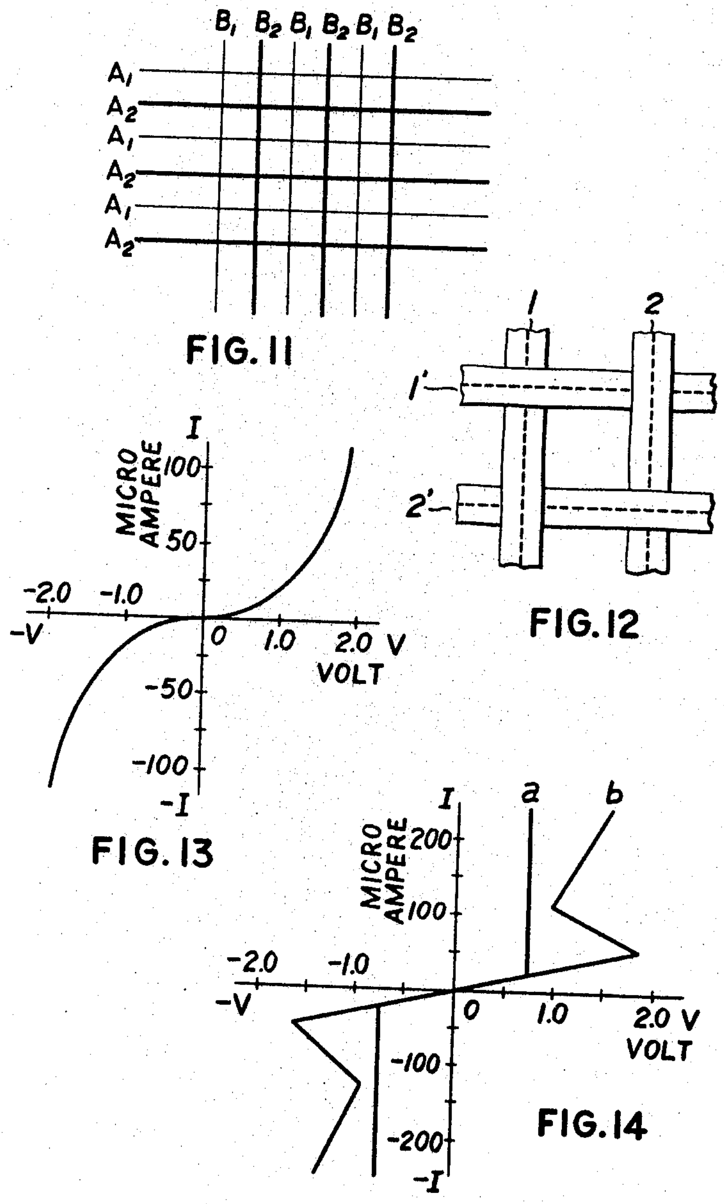
FIG. 11 is a schematic view of a circuit element of the invention in use.
FIG. 12 shows a circuit consisting of a plainly woven structure of glass fiber according to the invention.
FIG. 13 is a graph showing non-linear characteristics between voltage and current which are present between crossing fibers.
FIG. 14 is a graph showing voltage-current characteristics of cross fibers which possess non-linear characteristics.

To begin with, a circuit formed of four single fibers 1, 1', 2, and 2' of glass, e.g. vanadate glass, having a core of metal, e.g. iron, woven plainly together, as shown in FIG. 12, will be described. Of the four points of intersection, it is assumed that, in two or more points, there exist such non-linear voltage-current characteristics, for example as shown in FIG. 13, between the metallic cores of two crossing fibers, while the rest of intersecting points are not short-circuited or not insulated. At this time, voltage-current characteristics as given in *a* or *b* of FIG. 14 can be obtained between the metallic cores of two crossing fibers which have the non-linear characteristics.

For example, when non-linear characteristics as given in FIG. 13, exist in the intersecting point of 1 and 1', and there is at least one of the relations illustrated in FIG. 13, in the points of intersection 1, 2', and 2, 2', and 2, 1', while the rest of points are not insulated and resisted or not shorted, the current which flows across the intersecting point 1, 1' is influenced by the parallel non-linear circuit which extends through other points of intersection, and consequently gives distinctive voltage-current characteristics as shown in *a* or *b* of FIG. 14.

When non-linear characteristics as given in FIG. 13 exist in whole intersecting points, there is likewise the symmetrical curve as shown in FIG. 14.

Otherwise, in case that characteristics as given in FIG. 13 exist in one intersecting point, and the rest of intersecting points are or not insulated, the characteristics as shown in FIG. 14 are obtained. Although the characteristics are given symmetrically in FIG. 14, either in *a* and *b*, with respect to the origin, as an example of symmetrical arrangement of intersecting points as in FIG. 13, it should be noted of course that the symmetry is not always maintained depending on the voltage-current characteristics of the respective intersecting points, and that the phenomenon occurs only in the first quadrant. It should also be taken for granted that the characteristics can be allowed to emerge symmetrically by increasing the mesh of network.

In FIG. 14, *a* represents characteristics similar to those of so-called Zener diode, and the curve *b* represents negative resistance curve of current control type. The fact that the characteristics emerge in first and third quadrants as exemplified in FIG. 14 is a unique feature of the invention, meaning that the elements can work as symmetrical elements, that is, active elements having no polarity. If approximated to the elements developed in Japan and elsewhere and known as "thin film transistors," and if the working principles are simulated to those of field-effect type transistors, an outline of the elements according to the invention will be obtained. In other words, the non-linear characteristics can be produced by controlling the inner carriers such as glassy semiconductor, insulator and crystalline semiconductor with an electric field through application of a voltage to the 3rd electrode or application of a voltage to a bypass corresponding to the 3rd electrode. While field-effect transistors have already been made public, the present invention differs in contsruction and fundamental principles from conventional transistors, and permits simultaneous formation of all the regions of electron-doners and-acceptors which are produced by semiconductors and insulators, together with main electrode and control electrode, by braiding, spinning, or weaving glass fibers.

It is therefore possible of course to incorporate the inherent properties of ordinary transistors so far as the energy density distribution, controlling method, and functions of electrons or holes, or both, as the case may be, are concerned.

Next, description will be made on application of the invention to triodes.

To explain such non-linear voltage-current characteristics a little further, the characteristics of the unit as shown in FIG. 13 are such that either of the curve of first quadrant or third quadrant is close, in diode, to the formula $$I=KV^{3/2}$$

where

K=proportional constant
I=current
V=voltage but, of course, depend more or less on the type of metal and properties of the material between the two poles. In extreme cases, curves close to rectification characteristics of thin film of selenium can be obtained.

Thus, we may consider that the above relations corresponds to the relations among the anode, cathode, and grid in a triode. In case of a vacuum tube, the flow of electrons in vacuum is controlled by the grid, and the non-linear characteristics between the voltage and current are utilized in amplifying signal voltage or current or power or the positive feedback is taken advantage of in effecting oscillation.

Under the invention, discharge current in an insulating substance or current in a substance high resistance, or current in electron-conductive or hole-conductive semiconductor is controlled instead of the flow of electrons in vacuum, by the third electrode. Depending on whether the substance between the electrodes takes the form of glass structure, single crystal, polycrystal, or amorphous structure, there occur some variations in electric conductivity, dielectric constant, and other properties. In essence, however, there is no difference at all in the principle that where non-linear voltage-current characteristics are obtained they are utilized effectively.

The non-linear characteristics herein described can be obtaind not only by glass fibers which are usually regarded as insulating, such as lead-borate glass and silicate glass, but also by those having very high resistance with volume resistivity in the range of about $10^6$–$10^{10}\Omega$. Even in elements having such glass layers or which have been partially or wholly crystallized by heat treatment can have a very wide difference in energy level between the packed zone and conductive zone of electrons and holes, usually amounting to several ev.

However, because of the very short distance between the metallic cores of crossing fibers, electrons and holes excited by the potential difference of merely several volts can easily reach the conductive zone. This current resembles that produced by the behavior of thermions emitted from the hot cathode in a vacuum tube.

The non-linear characteristics above described are usually improved in elements consisting of fibers formed of semiconductive glass known as low-softening glass such as vanadate glass, chalcogenite glass, iodite glass, and bromide glass, with the crosses fused in the vitreous form or crystallized partially or wholly. In such semiconductive glass, the impure energy level of electrons and holes is controllable to the order of 0.1 ev., in the course of synthesis, and have many advantageous properties such as in thermal hysteresis, changes with age, etc. as above described.

In a circuit embodying the invention, the resistances of cores in fibers can be used as load resistance, bias resistance, input resistance, and the like. Also, the non-linear characteristics or linear characteristics (resistance) between fibers and capacitor-like functions due to dielectric polarization can be utilized as resistances and capacitances. Furthermore, the parts constituting closed circuit can be used as electric inductances.

The function of a grid in a vacuum-tube triode is fulfilled by 2 or 2' with respect to 1 or 1' in the embodiment of the invention shown in FIG. 1. It is also natural that the grid voltage can be applied from a power source different from that for the voltage applicable between the plate and cathode. It is needless to say that the non-linear characteristics obtained by two-terminal element described before can also be secured by setting in a third electrode separately. For example, if the part 1 in FIG. 12 is regarded as a plate, 1' as a cathode, and 2 or 2' as a grid, and if they are connected to a power source, characteristics as shown in FIGS. 14 and 15 can be obtained.

Figures 15, 16, 17:
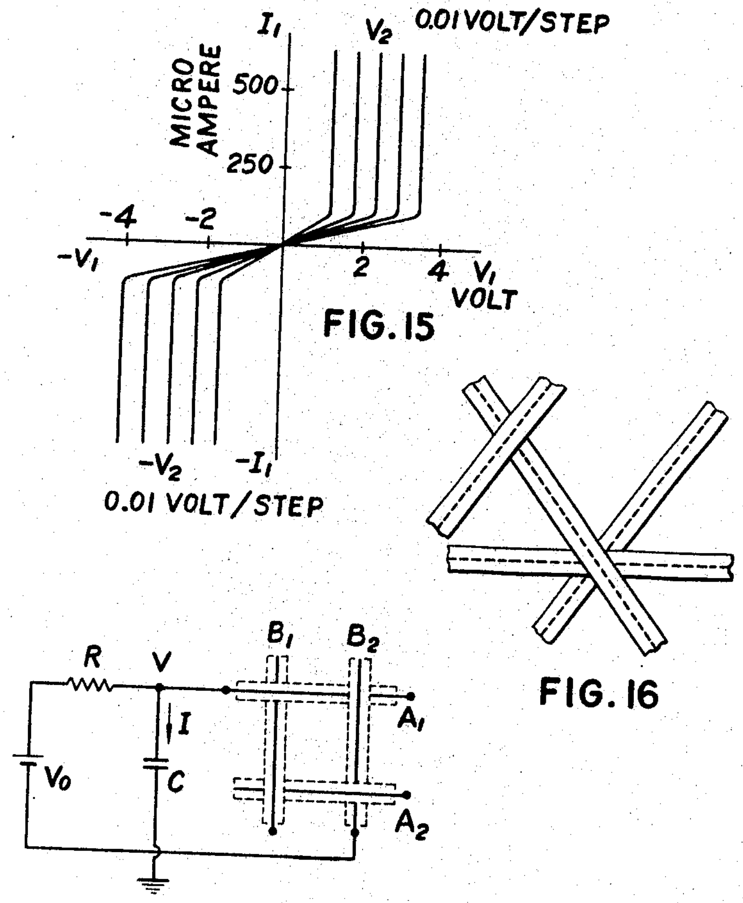
FIG. 15 is a graph showing the characteristics of voltage $V_1$ and current $I_1$ observed when a third electrode was set in addition to two terminals and a control voltage $V_2$ was applied and the intensity was changed in step-like fashion.
FIG. 16 is a view of three single fibers plainly woven together in accordance with the invention.
FIG. 17 is a typical circuit for pulsed oscillation incorporating the circuit element according to the invention.

FIG. 15 shows the $V_1$—$I_1$ characteristics obtained by providing a third electrode, applying a controlling voltage $V_2$ thereto, and by changing the intensity of the voltage in step-like fashion. It is particularly notable in the present invention that, even if the voltage-current direction is reversed, similar characteristics are obtained in symmetrical positions as in FIG. 15.

An element having such characteristics as represented by the curve *a* in FIG. 14 can be used in a voltage stabilizing circuit. An element having the characteristics as represented by the curve *b* in the same figure can be used in effecting oscillation by taking advantage of its negative resistance. Of course it is possible to use the characteristics as shown in FIG. 15 in effecting signal amplification.

As will be understood clearly from the foregoing description, the circuit element according to the invention not only functions as ordinary vacuum tube (diode, triode, or tube having more electrodes) but possesses unmatched features. In the fundamental structure, and in spatial and geometrical composition, it is superior to minute compositions of ultramicro vacuum-tube circuits and transistors.

It will be seen from the above description that the element according to the invention used either singly or in combination of more than two can equivalently reproduce the performance characteristics of diode, triode and other multi-electrode tubes and composite tubes in the field of vacuum tubes.

Now, the element of the invention as applied to an amplification circuit will be explained.

In case if, in the circuit shown in FIG. 8, there exist voltage-current characteristics as shown in FIG. 9, among the single fibers 6, 7 and 8, or, in case if there is so-called transistor action, the current which flows through the base-resistance is amplified. In this case, the element can be said adapted for base-input current amplification.

The amplification depends on the size of load resistance, but usually the amplification rate of a pair of transistors (formed of two intersecting points) is in the range from 1.5 to 50.

When there are characteristics as shown in FIG. 15 among the single fibers 6, 7, and 8, the terminal voltage $e_1$ of $R_1$ is amplified to the terminal voltage $e_2$ of $R_2$. In this case, the element can be said adapted for voltage amplification. An element having a voltage amplification ranging from 1.2 to 50 can be obtained with ease.

According to the present invention, the element density can be increased by weaving the fibers in fine texture. For the reason, the gain when the element is used as amplifier is very large even when the amplification rate of element is small as a unit transistor.

Although the fiber element compositions described thus far are invariably woven plainly of four single fibers, similar characteristics can be obtained by element formed of three fibers as shown in FIG. 16. The same applies to distribution-type circuit network consisting of a large number of such unit compositions.

It is a feature of the invention that, in the network structure, the irregularity in electrical properties and geometrical construction at intersecting points of fibers do not affect the circuit performance as a whole, because the characteristics can be controlled by spot heating and other method.

For example, it will be readily understood from the non-linear current-voltage characteristics above described that the circuit element according to the invention has switching action and is adapted for composition of a logical operation circuit.

In the case of a group of fiber elements shown in FIG. 11, the differences in the size of single fibers bring directionality in the directions of diodes at respective intersecting points and hence in the transistor actions formed among adjacent intersecting points, and the routes through which signals are amplified are governed by the DC bias voltage to be applied from the outside to the individual fibers and by the grounding formula.

For example, the fibers indicated by symbols A and B are fiber elements according to the invention which both use Fe wire as the core and both have glass layer formed essentially of GeS. The fiber A contains a trace of Al, and the fiber B contains a trace of As. As shown, they are woven as glass fibers, and the intersecting points are jointed and crystallized by heat treatment.

The fiber A serves as P-type transistor, and the fiber B as N-type transistor. By selecting the geometrical structure of the junction region as above described, $B_1A_1B_2$ could be synthesized into an NPN-type transistor, and $A_1B_1A_2$ into a PNP-type transistor. In the woven circuit, the transistors of PNP-type and NPN-type are in cascade connection. If bias voltage is fed from the outside to the fibers in rows A and B, an input signal introduced from a terminal of the woven circuit is amplified and can be taken out of the other terminal. It is possible to attach input and output lines to any desired points of fibers in the form of electrodes without energy barrier.

Instead of the PNP or NPN transistors above described, elements having such non-linear voltage-current characteristics at intersecting points of fibers as shown in *a* or *b* of FIG. 14 may be used to form the rows A and B.

Lastly, use of the element according to the present invention in a self-exciting oscillation circuit will be described.

A typical example of circuit for use in pulse generation is illustrated in FIG. 17.

The active element woven of single fibers $A_1$, $A_2$ and $B_1$, $B_2$ may be either an active element having negative resistance characteristics as shown in FIG. 6 which are derived basically from the symmetrical current-voltage characteristics as given in FIG. 13, or may be such that has negative resistance characteristics by pnpn junctions controlled by impurities.

Figure 18:
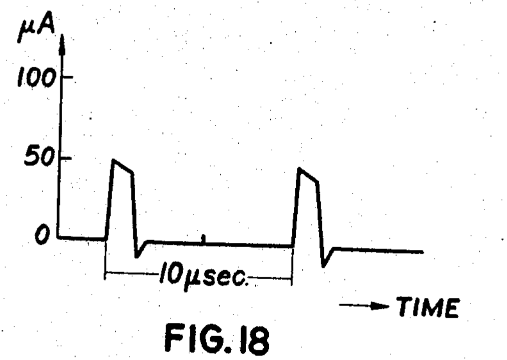
FIG. 18 shows changes of pulse current due to self-exciting oscillation by the circuit shown in FIG. 17.

In FIG. 17, symbol V*o* designates a DC power source, R a resistance for current regulation, and *c* a condenser. If it is assumed that the resistance R passes across substantially the middle point of the negative characteristics and has a resistance value greater than the value of negative resistance, the circuit will effect a stable self-exciting oscillation. As the result, a pulsed current which repeats relaxation and tension with time as shown in FIG. 18 is produced, which can be taken out of a terminal of the fiber element through a suitable load.

Also it is possible to utilize the electrical capacities existent among fibers, instead of using additional condenser to the outside of fiber element.

As another example of oscillation circuit, a fiber element which has negative resistance owing to a tunnel effect as shown in FIG. 14 may also be employed. In this case, usually the element on the side of power source is designed to be of constant voltage type. If fiber elements having amplification rate of greater than one are combined suitably so that a positive feedback can be applied from the output side to the input side, an oscillating circuit can be assembled, as seen so often in ordinary vacuum-tube and transistor circuits that no more mention will be made here.

Further, it may be made into a memory element having the properties of ferromagnetism and ferroelectricity by twisting with said fibers, or by crystallizing twisted fibers.

The above-mentioned glass fiber can be used itself as a thermoelectric element, and also spinning fiber itself, or said fiber heated and fused in a part of contact or crystallized in part or whole of said fiber, may be made into the same element. In addition to the above method, as said glass fiber or spinning fiber has a property of piezo-electricity, it may be utilized as a piezo-electric element.

In conclusion, the significant features and objects of the invention are summarized hereunder.

(1) Various active elements and passive elements of conventonal types formed basically of pure semiconductors and impure semiconductors can be now made of fibers.

(2) The electrical properties of various active and passive elements attained by the technology of vacuum tubes can be reproduced equivalently by fibers.

(3) Adoption of fibers and development of new electrical proeprties from the use of textile compositions.

(4) Development of formula of information processing in electronic circuits of distribution type incorporating active and passive elements.

(5) Development of process for physical and chemical control of glass structure and its application in the field of electronics.

(6) Realization of geometrical design in fabrication of switching circuit or logical operation circuit.

(7) Union of textile technology with solid state physics and electronics.

What is claimed is:

1. A method of making a circuit element by bonding glass fibers having a metallic core, comprising weaving said glass fibers into a plain weave including three to four single glass fibers, and heating said fibers at the junctions therebetween to join and crystallize at least a part of said plain weave to form a junction region of thin semi-conductor layer and thin insulating layer and a point-contact between said fibers.

2. A method according to claim 1, including forming said glass fibers from a compound selected from the group consisting of an oxide, sulfide, and arsenide.

3. A method according to claim 1, wherein the glass is an organic semi-conductive substance with a high molecular weight which has dispersed therein minute powdery crystals of an organic semi-conductive substance of relatively low molecular weight.

References Cited

UNITED STATES PATENTS

| | | | |
|---|---|---|---|
| 2,718,049 | 9/1955 | Prache. | |
| 2,718,052 | 9/1955 | Dexter | 29—592 |
| 2,915,686 | 12/1959 | Schubert. | |
| 3,030,257 | 4/1962 | Whearley et al. | |
| 3,100,295 | 8/1963 | Schweizerhof | 29—604 X |

JOHN F. CAMPBELL, *Primary Examiner.*

U.S. Cl. X.R.

148—1.5; 317—235